United States Patent [19]

Appenzeller et al.

[11] Patent Number: 4,506,421

[45] Date of Patent: Mar. 26, 1985

[54] CONTROLLED-DEFLECTION ROLL

[75] Inventors: Valentin Appenzeller, Kempen; Eduard Küsters, Gustav-Fünders-Weg 18, 4150 Krefeld-Forstwald, both of Fed. Rep. of Germany

[73] Assignee: Eduard Küsters, Krefeld, Fed. Rep. of Germany

[21] Appl. No.: 392,765

[22] Filed: Jun. 28, 1982

[30] Foreign Application Priority Data

Jul. 21, 1981 [DE] Fed. Rep. of Germany ....... 3128722

[51] Int. Cl.³ .............................................. B21B 13/02
[52] U.S. Cl. ........................ 29/116 AD; 29/113 AD; 100/162 B
[58] Field of Search ...... 29/116 AD, 116 R, 113 AD, 29/113 R, 110; 100/162 B

[56] References Cited

U.S. PATENT DOCUMENTS 4,089,094  5/1978  Kaira .............................. 29/116 AD
4,233,011  11/1980  Bolender et al. ........... 100/162 B X
4,283,638  8/1981  Christ et al. ................ 100/162 B X

FOREIGN PATENT DOCUMENTS 405835  2/1965  Japan ............................ 29/116 AD
633966  11/1978  U.S.S.R. ....................... 29/116 AD Primary Examiner—Carl E. Hall
Assistant Examiner—John T. Burtch
Attorney, Agent, or Firm—Kenyon & Kenyon

[57] ABSTRACT

In a controlled deflection roll comprising a rotating shell forming the working roll periphery and a stationary beam extending lengthwise through the shell and spaced all around from the inner periphery of the shell, the space between the beam and the inner periphery of the shell, in the neighborhood of the operative plane, is divided into chambers by longitudinal seals and a number of transverse seals, the chambers have separate feed lines and each pair of adjacent chambers has a common transverse seal between them. Neighboring chambers are connected by a duct and non-return valves so that the transverse seal is always acted upon by the pressure of the higher-pressure chamber and pressed against the inner periphery of the shell. The chambers can be formed on the side of the beam facing the nip and also on the side remote from the nip and can also be individually filled with pressure fluid at different temperatures.

11 Claims, 9 Drawing Figures

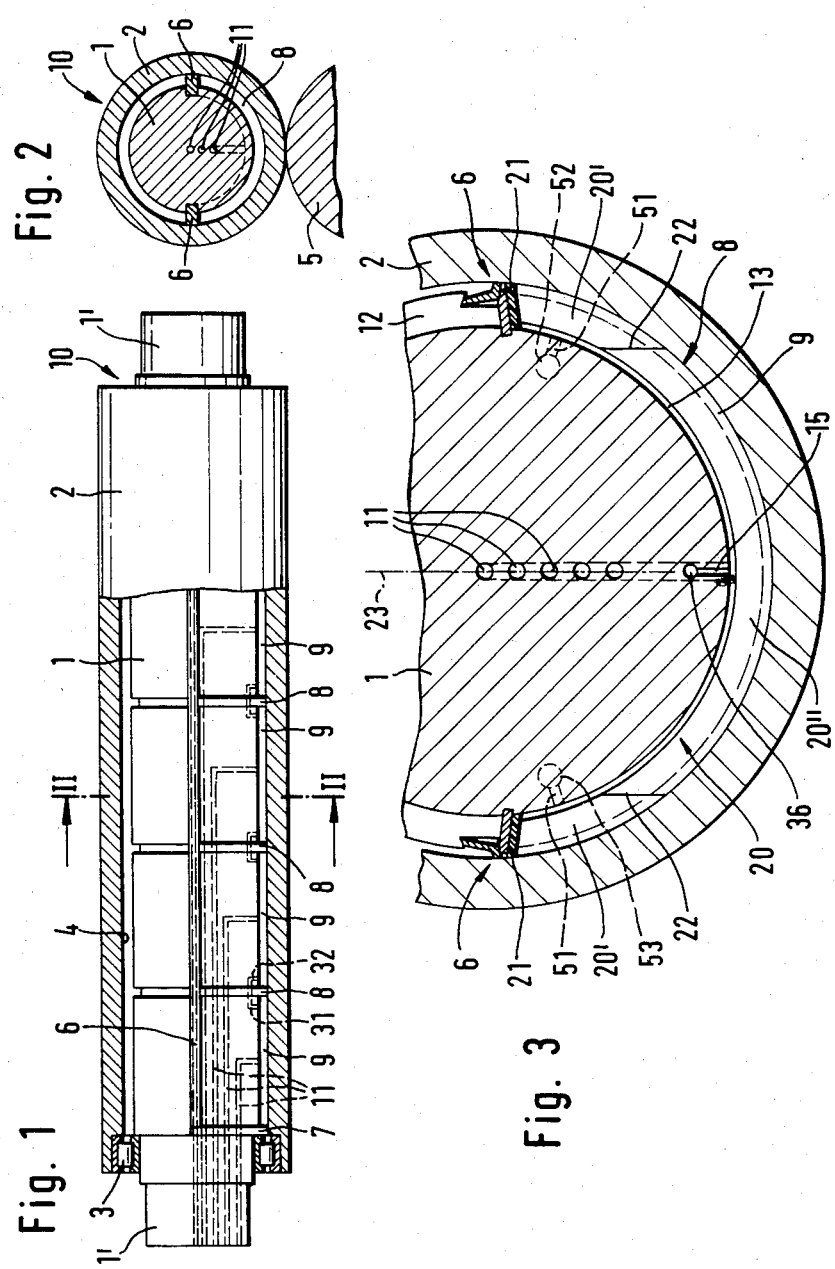

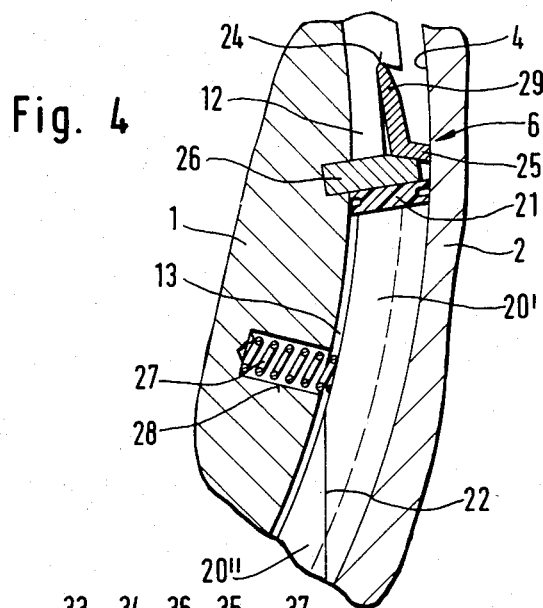
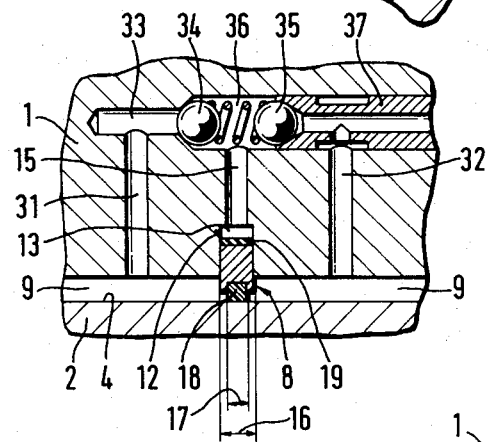
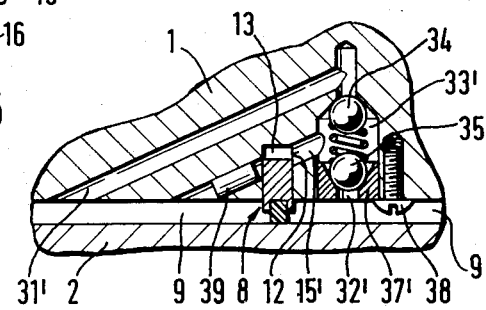

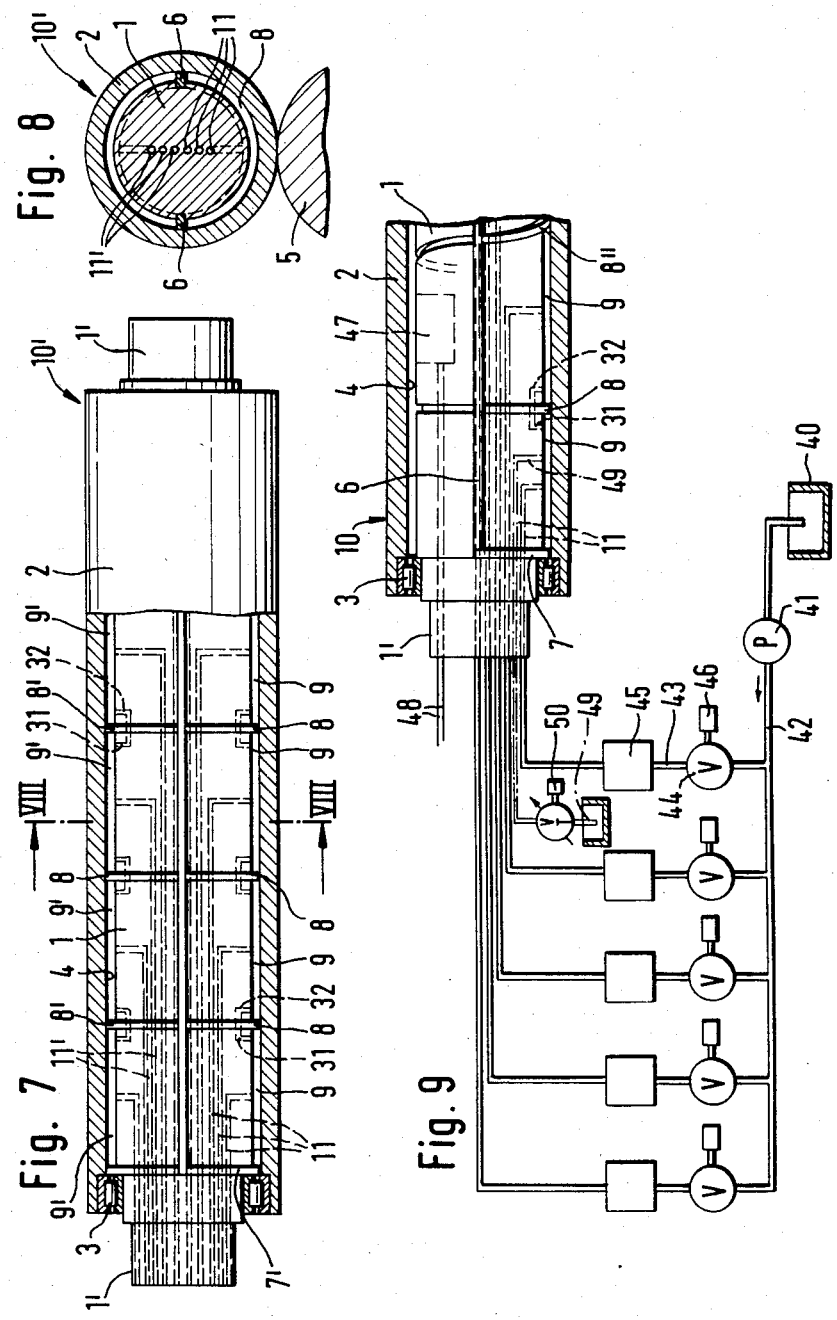

CONTROLLED-DEFLECTION ROLL

BACKGROUND OF THE INVENTION

This invention relates to controlled deflection rolls, in general and more particularly to an improved controlled deflection roll.

A known type of controlled deflection roll comprises a rotating shell forming the working roll periphery and a stationary beam extending longitudinally through the shell and at a distance on all sides from the inner periphery of the shell, and chambers defined by seals between the beam and the inner periphery of the shell on the beam, a number of chambers being disposed along the shell in the neighborhood of the operative plane of the roll and the chambers being fillable with a fluid pressure medium, the pressure in each individual chamber being separately adjustable, the arrangement being such that a fluid pressure medium supplied to a respective cavity presses each of the seals against the inner periphery of the shell with a pressure depending on the pressure in a corresponding adjacent chamber.

German AS No. 26 55 893 discloses a controlled deflection roll of the aforementioned kind in which the chambers are separated by closed frames which abut the inner periphery of the shell and are pressed and sealed by seals extending around the frame and disposed at the back between the frame and the beam. The seals can be hoses filled with a fluid pressure medium at a higher pressure than in the chamber formed by the corresponding frame.

The use of frames to separate the chambers given a complicated construction, as a result of which some of the area available on the back of the beam cannot be used for exerting pressure.

SUMMARY OF THE INVENTION

According to the present invention, in a controlled deflection roll comprising a rotating shell forming the working roll periphery and a stationary beam extending longitudinally through the shell and at a distance on all sides from the inner periphery of the shell, and chambers defined by seals between the beam and the inner periphery of the shell on the beam, a number of chambers being disposed along the shell in the neighborhood of the opertive plane of the roll and the chambers being fillable with a fluid pressure medium, the pressure in each individual chamber being separately adjustable, the arrangement being such that a fluid pressure medium supplied to a respective cavity presses each of the seals against the inner periphery of the shell with a pressure depending on the pressure in a corresponding adjacent chamber, the seals comprise longitudinal seals disposed on each side of the operative plane, transverse end seals disposed at both ends of the roll, and further transverse seals spaced apart along the roll, common to each pair of successive chambers, co-operating with the longitudinal seals to form the closed chambers.

In a preferred embodiment, the longitudinal seals are continuous and only transverse webs are required as the partitioning means. Since the webs are common to adjacent chambers in the longitudinal direction, the number of webs is halved, compared with the frame systems, and an additional area is freed for exerting pressure.

Conveniently the transverse seals for forming the chambers are disposed on the side of the roll facing the nip and/or on the side of the roll remote from the nip in the neighborhood of the operative plane.

Preferably the transverse seals are annular webs, having a substantially rectangular cross-section and being movably disposed in annular slots in the beam, a cavity being formed at the base of each annular slot under the annular web. Preferably the annular webs are sealed at both ends against the longitudinal seals so that the webs remain sealingly tight even when they move in the annular groove in the operative plane of the roll relative to the stationary longitudinal seal.

One difficult problem is to maintain sealing tightness at the place where the transverse seals meet the longitudinal seals when the ends of the annular webs forming the transverse seals move away from or towards the longitudinal seal, which is permanently secured to the beam. The annular webs are always urged by the pressure in the cavity against the inner periphery of the shell and consequently follow the shell in the operative plane when the shell moves relative to the beam, e.g. when the beam sags.

Conveniently, therefore the annular webs are divided on both sides of the operative plane by partition surfaces extending parallel to and at a distance from the operative plane, the adjacent parts being movable in tight, sealing engagement with one another at the partition surfaces. This substantially avoids moving the ends of the annular webs at the longitudinal seals, whereas the central part of the web near the operative plane, which has to travel the greatest distance to follow the shell, can move as required at the partition surface.

Advantageously the fluid pressure medium in each of the cavities is connected to the fluid pressure medium in one of the respective adjacent chambers and the sealing surfaces of the transverse seals are smaller than the respective operative surfaces of the seals exposed to the pressure medium within the respective cavity. This provides a simple method of subjecting the transverse seals to a pressure which is automatically always in the right proportion to the pressure in the corresponding chamber.

In a preferred embodiment, each pair of neighboring chambers in the longitudinal direction is connected by a respective duct, which contains a respective non-return valve, to a common space, the non-return valves each acting to permit the flow of fluid only towards said common space. A connecting line extends from the common space to the cavity acting upon the transverse seal common to the two neighboring chambers. This is an important embodiment of the invention closely connected with the fact that the transverse seals are common to neighboring chambers. It is important to ensure that the pressure on the transverse seals is always derived from the higher pressure in the neighboring chambers, since otherwise the pressure in the cavity may be too low to hold the transverse seal against the shell. When the transverse seals move, pressure medium from the chamber at the higher pressure is discharged into the common space, since the pressure in the chamber at the higher pressure opens the respective non-return valve and the other non-return valve remains closed. The common space between the non-return valves is connected by the connecting line to the cavity under the transverse seal. As a result, the higher pressure between the non-return valves always automatically reaches the cavity and acts on the transverse seal.

The distribution of line pressure can also be influenced by deliberately varying the temperatures along the shell.

To this end, separate cooling or heating devices having an associated temperature control device can be provided in the feed lines of successive chambers in the longitudinal direction of the roll or in the chambers themselves, so as to produce varying temperatures in the chambers.

For example, if the temperature rises in a chamber, the shell becomes somewhat warmer opposite the chamber and its diameter increases somewhat, which of course has an effect on the nip.

Preferably at least one of the chambers has a separate return line for pressure fluid, containing a throttle device. This is of use when the flow of pressure fluid through a chamber must not be dependent on normal leakage alone. Such a situation may occur, e.g., if chambers are disposed opposite one another on the side facing the nip and on the side remote from the nip. Unless there is a separate return line, the pressure fluid can flow only into the neighboring chamber. Separate return lines are particularly important if heated pressure fluid from outside the roll has to be introduced into the chambers to heat the roll. To transfer the required amount of heat, a given throughput of pressure fluid is necessary, and often this cannot be obtained by leakage alone.

In one embodiment the transverse seals are arranged in a spiral, to prevent unacceptable local heating of the shell by friction of the transverse seals. The spiral distributes the heat of friction over a longer portion of the shell.

Preferably the cavity formed in the groove under the transverse seal is connected by a pair of passages to a feed line or a discharge line in the beam and a cooling device and a pressure control device are disposed in the feed line.

BRIEF DESCRIPTION OF THE DRAWINGS

FIG. 1 is a view of a roll according to the present invention, partly in longitudinal section.

FIG. 2 is a cross-section along line II—II in FIG. 1.

FIG. 3 is a cross-section corresponding to the lower half of FIG. 2 on a larger scale.

FIG. 4 is a partial cross-section of the sealing region of the roll shown in FIGS. 1 to 3.

FIGS. 5 and 6 show partial longitudinal sections of the beam and shell of the roll of FIGS. 1 to 4 in the neighborhood of a transverse seal, showing various means of supplying the pressure.

FIGS. 7 and 8 are views corresponding to FIGS. 1 and 2 of a modified embodiment of a roll according to the present invention.

FIG. 9 is a diagrammatic view of a roll provided with heating device.

DETAILED DESCRIPTION

FIG. 1 shows a roll comprising a stationary beam 1 on which a shell 2 is rotatably mounted on bearings 3 at both ends of shell 2. The ends 1' of beam 1 project from shell 2 and are mounted, e.g., in a roll stand. The inner periphery 4 of shell 2 leaves an annular space all the way around between it and beam 1, so that beam 1 can bend or sag inside shell 2 without coming in contact with the inner periphery 4 of the shell 2.

The operative plane of roll 10 extends vertically as shown in FIG. 2 and the operative side is the lower side of roll 10. A co-acting roll 5 is adjacent the bottom of roll 10.

The space between the inner periphery 4 of shell 2 and the outer periphery of beam 1 is divided into individual chambers on the operative side by longitudinal seals 6 disposed substantially diametrically opposite one another half way up the beam 1, by transverse end seals disposed at the ends adjacent the inner sides of bearings 3, and by further transverse seals 8 disposed between them at intervals. Seals 6, 7 and 8 are mounted on the beam 1 and the inner periphery 4 of the shell 2 slides along them when roll 10 is in operation. Chambers 9 extending along the bottom periphery of beam 1 on the operative side of roll 10 are thus defined, these chambers being sealed in the peripheral direction by longitudinal seals 6 and in the longitudinal direction by seals 7 and 8. Each chamber 9 has a separate feed line 11 for the supply of a fluid pressure medium to the chamber, which in the embodiment described is a hydraulic pressure fluid which simultaneously lubricates the seals. In this manner the various chambers 9 along the roll can each be maintained at a different pressure. The pressure gives the force required for maintaining the line pressure against the inner periphery 4 of shell 2 on the operative side. The forces are transmitted to the beam 1, which bends upwards under the load as will be appreciated from FIG. 1.

The bending line of shell 2 can be adjusted independently of the bending or sagging of beam 1.

The illustrated embodiment shows five chambers 9, but there can be any number of chambers. The bearings 3 at the ends of shell 2 are likewise illustrated only by way of example. The roll need not have the aforementioned bearings, i.e., the entire shell 2 can move relative to beam 1 along its entire length in the operative plane.

At the transverse seals 8, the beam 1 is formed with peripheral grooves 12 having a rectangular cross-section, as can be seen most clearly from FIGS. 5 and 6, which shows two alternative embodiments. The transverse seals 8 have a rectangular cross-section and are bent edgewise into a semicircular web 20 (see FIG. 3) which is radially movable in groove 12, at the base of which it leaves a cavity 13 which can be filled with pressure fluid via a line 15. The surface acted upon by the pressure fluid in cavity 13, indicated by its width 16, is greater than the bearing surface of transverse seal 8 on the inner periphery 4, which is likewise indicated by its width 17 (FIG. 5). The bearing surface is an insert 18 of sliding material set in a peripheral groove in the transverse seal 8. Advantageously a seal 19 is inserted at the side of cavity 13, to prevent web 20 from being too tightly inserted into groove 12 (FIG. 5).

As FIG. 3 shows, the substantially semi-circular web 20 forming the transverse seal 8 is sealed by seals 21 at its ends adjacent the longitudinal seals 6. However, the movements made relative to beam 1 by the part of shell 2 adjacent the operative plane may be considerable, on the order of 10 to 20 mm or more. Seal 21 could not absorb such movements while remaining sealingly tight. For this reason, as shown in FIG. 3, web 20 is divided, into a central part 20" and two parts 20' adjacent the longitudinal seals 6, by partition surfaces 22 which extend parallel to the operative plane 23 and a long way outward, i.e., to near the longitudinal seals 6. Part 20" moves along the partition plane relative to parts 20' parallel to plane 23. Parts 20' remain in abutment against seal 21. Sealing tightness is maintained, because parts 20' and 20" continue to abut one another at surface 22.

even though small relative movements may occur and the facing end surface may not always remain parallel in surface 22. Even if the seal is not hermetic, the transverse seals 8 continue to operate, since the edges of chambers 9 cannot give a hermetic seal. The only essential is to obtain a dynamic equilibrium at which the desired differences in pressure can be maintained without using excessive amounts of pressure fluid. The required pressures are not very high and are usually on the order of a few bars.

FIG. 4 shows one embodiment in greater detail. Seal 6 comprises an L-shaped part (a bronze strip) adjacent the inner periphery 4 of shell 2, the outer side of one arm 29 of the L-shaped part engaging a groove 24 in the periphery of beam 1 and the outer side of the other arm 25 abutting the inner periphery 4 of shell 2. As shown in FIG. 4, parts 29 and 25 are held by a longitudinal web 26 which is radially inserted in beam 1 and extends under the part 25. The bearing pressure of the part 25, however, is provided mainly by pressure fluid entering the space between beam 1 and the facing side of arm 29.

The seal 21 bears against the underside of the web 26. In order to ensure that parts 20', 20'' are in abutment when the pressure is building up, compression springs 27 can be provided and act against the backs of parts 20' and 20'', the springs being disposed in radial bores in beam 1 in the neighborhood of the peripheral groove 12.

As shown in FIG. 5, the transverse seal 8 is bridged by a duct comprising radial bores 31 and 32 leading into the adjacent chambers and a longitudinal bore 33 connecting them. Bore 33 contains two spaced apart non-return ball valves 34 and 35. The valve 34 facing the radial bore 31 closes against bore 31 whereas the valve 35 facing bore 32 closes against bore 32. The space 36 between valves 34 and 35 is connected by a line 15 to cavity 13. When the pressure in the left chamber 9 is higher than that in the right chamber 9, valve 34 is opened and valve 35 is closed. The pressure fluid enters the space 36 and, via line 15, enters cavity 13. When the pressure in the right chamber 9 is higher, valve 35 is opened and valve 34 is closed and, as before, the higher pressure enters cavity 13 via space 36 and line 15. Transverse seal 8 is therefore always pressed against the inner periphery 4 of shell 2 by the higher pressure.

The longitudinal bore 33 is a stepped bore, the step serving as a seat for the non-return valve 34. The seat for valve 35 is formed by a sleeve 37 inserted in longitudinal bore 33.

FIG. 6 shows an embodiment which eliminates the longitudinal bore 33, which is difficult to manufacture owing to the length of beam 1. The corresponding bores are given reference numbers corresponding to those of FIG. 5 followed by a prime. An oblique bore 31' leads into the left chamber 9, the connecting line 15' is formed by an additional oblique bore, and the bore 33' containing valves 34 and 35 extends radially in the present case and connects the two oblique bores 31' and 15' in the manner shown in FIG. 6. The sleeve 37' forming the seat for valve 35 is held in bore 33' by a covering cap screw 38, radially inserted into beam 1. As in the embodiment in FIG. 5, the connecting line 15' leads to the space 36 between valves 34 and 35. The cavity 13 under seal 8 is intersected by bore 15', which is closed from the exterior by a plug 39. Transverse seal 8 is disposed between radial bore 32' and the mouth of oblique bore 31'.

FIGS. 7 and 8 show a controlled deflection roll 10' which is formed with chambers 9' on the side remote from the nip in addition to the chambers 9 on the side facing the nip. Parts in FIGS. 7 and 8 corresponding to the previous Figures are given similar reference numbers.

In roll 10', the transverse end seal 7' extends all the way around beam 1 and transverse seals 8' are also disposed above the longitudinal seal 6 and divide the space between shell 2 and beam 1 into chambers 9', while corresponding in other respects to seals 8. Seals 8' in FIG. 7 are disposed at the same place as seals 8 but this is not necessary. The longitudinal seal 6 is modified from the embodiment in FIGS. 3 and 4, so that it can seal off the pressure fluid both in the bottom chambers 9 and in the top chambers 9'.

As before, each chamber 9' has a separate feed line 11' for supplying pressure fluid at different pressures to the individual chambers 9'. The pressure distribution in the various chambers can be varied so as to influene the distribution of line pressure in the nip to an even greater extent than in the embodiment of FIGS. 1 and 2. Of course, a chamber 9' on the side remote from the nip exerts the strongest effect if the chamber is operated at full pressure and the opposite chamber 9 on the same side as the nip is simultaneously relieved of pressure, whereas the other chambers 9 on the nip side are pressurized.

FIG. 9 shows part of roll 10 of FIG. 1 and a device for maintaining different temperatures in the different chambers 9. Of course, the device can also be used in the embodiment according to FIGS. 7 and 8.

In FIG. 9, pressure fluid is taken from a storage container 40 and brought to a given pressure by a pump 41. A pressure fluid conveying line 42 branches into five parallel lines 43, each containing a valve 44 in series with a heating device 45 and opening into the five feed lines 11 in the roll and leading to the individual chambers 9.

Each valves 44 is connected to a control device 46 for bringing the pressure to the desired individual value in the associated chamber 9 in the line 43 behind valve 44. The fluid at the corresponding pressure flows through device 45, which brings it to the required individual temperature. Since some of the pressure fluid always escapes under seals 6, 7 and 8, a certain amount of pressure fluid through chambers 9 and contributes to transfer heat.

If for example the second chamber 9 from the left in FIG. 9 is set at a higher temperature than in the first chamber 9 from the left, the diameter of shell 2 will increase somewhat at the second chmaber, which of course affects the nip and influces the distribution of line pressure.

Instead of disposing the heating device 45 outside roll 10, the individual chambers can contain heating devices in the form of flat resistance heating elements 47 matching the surface of beam 1, one such heating element being shown by dashed lines in FIG. 9. The electric leads are denoted by 48. This method can provide stronger heating, since heat is directly transferred to the liquid chamber.

The individual chambers 9 and/or 9' can have separate return lines, one of which is shown in dash-dotted lines in the left chamber 9 in FIG. 9 and is marked 49. In order to build up a pressure in the chamber, an adjustable throttle device 50 is disposed in line 49. Line 49 can also be used for setting a given pressure in a chamber 9 and varying the flow rate, which is particularly important when shell 2 has to be heated by heated pressure fluid in the corresponding chamber 9. The amount of fluid travelling through chamber 9 and consequently the amount of transferred heat can be controlled in this way. The pressure fluid can be cooled instead of heated.

In the right chamber 9 in FIG. 9, the right transverse seal 8" is not disposed in a plane extending at right angles to the axis of beam 1 but extends in a slight spiral, obtained by forming an appropriate groove 12. As a result of the spiral arrangement of seal 8", the place where it abuts the inner periphery 9 is not limited to the width of the transverse seal, as in the case of seal 8 in FIG. 9. In the case of seal 8", the unavoidable heat of friction is distributed over a longer portion of shell 2. This may be important in some cases in which a particularly uniform pressure must be exerted. The pitch of the spiral along which seal 8" extends can be relatively small and of course should not exceed the length of a chamber 9, since the spiral chamber boundary will also influence the pressure distribution and care must be taken that pressure can still be exerted in successive individual regions along shell 2.

Another possibility for preventing the heat of friction at seals 8, 8' and 8" from causing harm, is shown in broken lines in FIG. 3. Instead or providing cavity 13 via line 15 with the higher pressure prevailing in the adjacent chambers 9, each cavity 13 can be connected by two passages 51, disposed as far as possible from one another, to a feed line 52 and a discharge line 53 respectively. The line system (not shown) containing feed line 52 comprises a pressure control device and a device for cooling the pressure fluid. Accordingly, line 52 supplies cooled pressure fluid to cavity 13, and the fluid flows through cavity 13 and out through line 53. Since seal 8 is made of a bronze material which is a good conductor of heat, the heat of friction produced at the surface where seal 8 bears on the inner periphery of shell 2 is dissipated by the pressure fluid flowing through cavity 13. The pressure control means comprises a constriction in line 53, as required to build up a sufficient counter pressure. In the present case the temperature and pressure in any one chamber are adjusted independently of the temperature and pressure adjustment in the neighboring chambers. In this case, therefore, there is no need for the overflow system in FIGS. 5 and 6. In practice the pressure in cavity 13 can be made equal for all the transverse seals 8, 8' and 8", at a value sufficient for the pressure prevailing in each of the chambers 9 and 9'.

What is claimed is:

1. In a controlled deflection roll comprising a rotating shell forming the working roll periphery and a stationary beam extending longitudinally through the shell and spaced on all sides from the inner periphery of the shell, and chambers defined by seals between the beam and the inner periphery of the shell on the beam, a number of chambers being disposed along the shell in the neighborhood of the operative plane of the roll, said chambers being fillable with a fluid pressure medium, the pressure in each individual chamber being separately adjustable, a fluid pressure medium supplied to a respective cavity pressing depending on the pressure in a corresponding adjacent chamber, the improvement comprising the seals comprising stationary longitudinal seals disposed on each side of the operative plane, said longitudinal seals extending through the whole length of the shell, transverse end seals, contacting said longitudinal seals, disposed at both ends of the roll, and further transverse seals spaced apart along the roll common to each pair of successive chambers, co-operating with said longitudinal seals to form the closed chambers, said transverse seals comprising annular webs, having a substantially rectangular cross-section and further including annular slots in the beam, said webs movably disposed in said slots, a cavity being formed at the base of each annular slot under the annular web and means for maintaining the annular webs tightly in a sealing manner against the stationary longitudinal seals even when they move in the annular groove in the operative plane of the roll relative to the stationary longitudinal seals.

2. A roll according to claim 1, and further including means connecting the fluid pressure medium in each of said cavities to the fluid pressure medium in one of the respective adjacent chambers and wherein the sealing surfaces of the transverse seals are smaller than the respective operative surfaces of the seals exposed to the pressure medium within said respective cavity.

3. A roll according to claim 1, wherein said means connecting include a respective duct from each chamber adjacent a cavity which contains a respective non-return valve, connecting to a common space, the non-return valves each acting to permit the flow of fluid only towards said common space, and a connecting line extending from said common space to the cavity acting upon the transverse seal common to the two neighboring chambers.

4. A roll according to claim 1, wherein the transverse seals for forming the chambers are disposed on the side of the roll facing the nip in the neighborhood of the operative plane.

5. A roll according to claim 1, wherein the transverse seals for forming the chambers are disposed on the side of the roll remote from the nip in the neighborhood of the operative plane.

6. A roll according to claim 1, wherein the transverse seals for forming the chambers are disposed on the side of the roll facing the nip and on the side of the roll remote from the nip in the neighborhood of the operative plane.

7. A roll according to claim 1, wherein said annular webs are divided on both sides of the operative plane by partition surfaces extending parallel to and at a distance from the operative plane the adjacent parts being movable in sealing, tight engagement with one another at the partition surfaces.

8. A roll according to claim 1 and further including heat transfer means disposed in the flow paths of successive chambers in the longitudinal direction of the roll to produce different temperatures in the chambers and temperature control means for each heat transfer means.

9. A roll according to claim 1 and further including a separate return line for pressure fluid, containing a throttle device, for at least one chamber.

10. A roll according to claim 1, said transverse seals extend in a spiral around the beam.

11. A roll according to claim 1 and further including a pair of passages connecting the cavity formed in the groove under the transverse seal to a feed line or a discharge line in the beam and a cooling device and a pressure control device disposed in said feed line.

* * * * *